(12) United States Patent
Imai et al.

(10) Patent No.: US 6,168,766 B1
(45) Date of Patent: Jan. 2, 2001

(54) PROCESS FOR LEACHING COPPER FROM COPPER SULFIDE USING BACTERIA

(75) Inventors: Tetsuo Imai; Atsushi Saitoh, both of Hitachi (JP)

(73) Assignee: Nippon Mining & Metals Co., Ltd., Tokyo (JP)

( * ) Notice: Under 35 U.S.C. 154(b), the term of this patent shall be extended for 0 days.

(21) Appl. No.: 08/937,115

(22) Filed: Sep. 24, 1997

(30) Foreign Application Priority Data

Mar. 27, 1997 (JP) .................................................... 9-075863

(51) Int. Cl.⁷ .................................................... C22B 15/00
(52) U.S. Cl. ................................. 423/27; 423/38; 423/41
(58) Field of Search ............................. 423/27, DIG. 17, 423/38, 41

(56) References Cited

U.S. PATENT DOCUMENTS

| | | | |
|---|---|---|---|
| 4,230,487 | * | 10/1980 | Demarthe et al. ..................... 423/40 |
| 4,571,387 | * | 2/1986 | Bruynesteyn et al. ......... 423/DIG. 17 |
| 4,987,081 | * | 1/1991 | Hackl et al. .................. 423/DIG. 17 |
| 5,462,720 | * | 10/1995 | Aragones ................................ 423/27 |

FOREIGN PATENT DOCUMENTS

69680/74 * 12/1975 (AU) ...................................... 423/27

* cited by examiner

*Primary Examiner*—Steven Bos
(74) *Attorney, Agent, or Firm*—Kilpatrick Stockton LLP

(57) ABSTRACT

Disclosed is a process for leaching copper from copper sulfide using bacteria, which ensures that the rate of leaching of copper increases to reduce the leaching time period and that the rate of leaching of primary copper sulfide contained in ores is increased. The process comprises using an acid leaching solution that includes both or any one of iron oxidizing bacteria and sulfur oxidizing bacteria in a concentration of 106 microbes/mL, the acid leaching solution having a redox potential of from 550 to 750 mV and 5 g/L or more of iron, the ratio of trivalent iron ions to bivalent iron ions ($Fe^{3+}/Fe^{2+}$) in the acid leaching solution being 50 or more.

10 Claims, 5 Drawing Sheets

PROCESS DIAGRAM

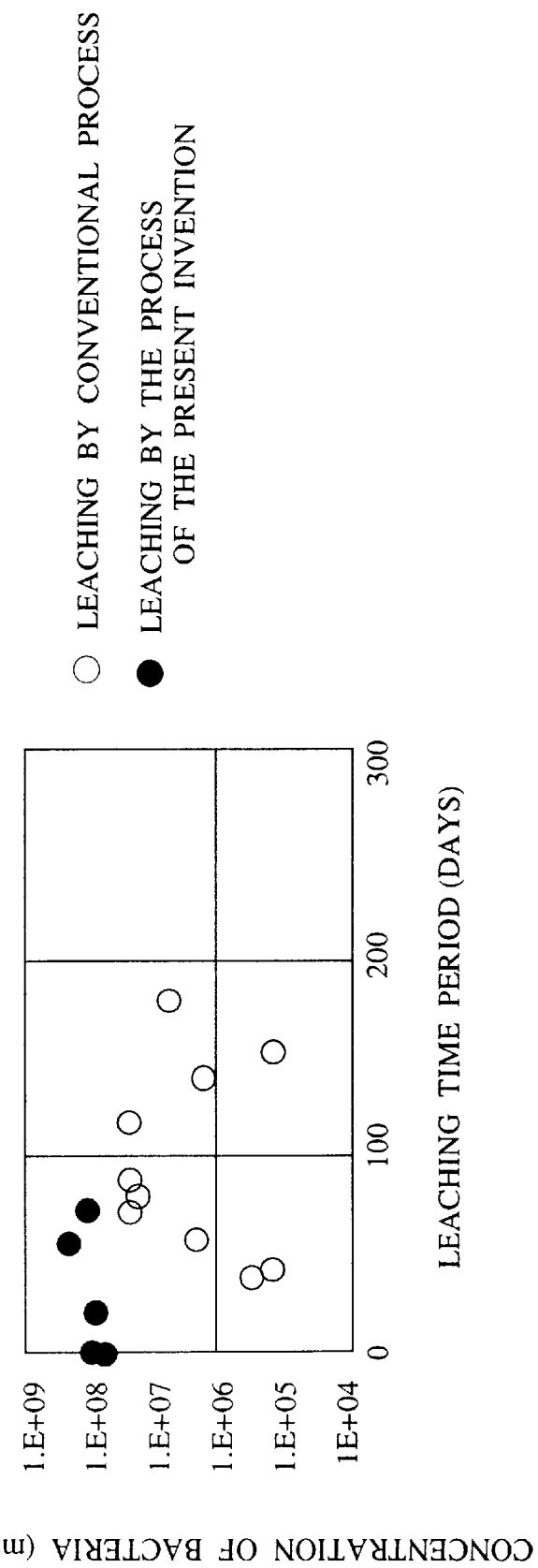

PROCESS FOR LEACHING COPPER FROM COPPER SULFIDE USING BACTERIA

BACKGROUND OF THE INVENTION

1. Field of the Invention

This invention relates to a process for leaching copper from copper sulfide using bacteria. More particularly, this invention relates to a process for promoting the velocity and rate of leaching of copper by keeping a redox potential of a leaching solution containing bacteria in a specific range.

2. Description of the Related Art

It is typical from an economical point of view to employ a process of extracting a target ore using lixiviate such as an acid and, thereby recovering precious metals from low grade ores. Leaching methods include an in-site leaching method, a heap leaching method, a vat leaching method, an agitation leaching method or the like. Among these methods, those considered to be suitable for treating the target ore, as well as the most economical, are employed. The in-site leaching method is characterized by a leaching solution directly disseminated into gob or ore deposit. In a dump leaching method or heap leaching method, dug ores are leached by scattering lixiviate solution on the ores. In the agitation leaching method, dug ores are mixed and agitated for extraction after milling.

The dump, or heap leaching method, is generally used in a leaching process for low grade ores. The rate of leaching of copper is 90% when copper oxide ores are treated with sulfuric acid for 1–2 months. However, when leaching treatment of copper sulfide ore is performed for one year, the rate of leaching of copper is 30% or less for primary copper sulfide (charcopyrite and the like), and 40% or less for secondary copper sulfide (chalcocite and covelline). These methods are uneconomical because of the low leaching rate.

As for leaching from copper sulfide, therefore, processes using bacteria are employed. *Thiobacillus ferrooxidans* (iron oxidizing bacteria), *Thioabacillus thiooxidan* (sulfur oxidizing bacteria) and the like are known bacteria species suitable for bacteria leaching. The various bacteria exhibit different characteristics depending on the district of origin. There are often cases where only bacteria sampled in a specific place arc effective depending on the sort of ores.

Bacteria leaching of copper sulfide includes two mechanisms, direct leaching and indirect leaching. In direct leaching, bacteria directly contribute to the oxidation of copper sulfide (see formula (1)). In indirect leaching, bacteria oxidize an iron source, such as pyrites and the like in ores, to produce trivalent iron ions that contribute to copper leaching. The trivalent iron ions are reduced to bivalent iron ions. The bivalent iron ions are oxidized to trivalent iron ions, and the leaching cycle is repeated (see formulae (2) and (3)). It is difficult to separate these reaction processes, and it is thought that these reaction processes proceed simultaneously.

Specifically, the direct leaching process (in the case of chalcocite) is represented by the following reaction formula:

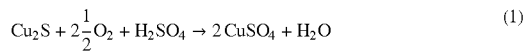

The indirect leaching process (in the case of chalcocite) is represented by the following reaction formula:

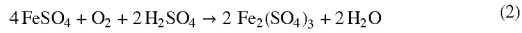

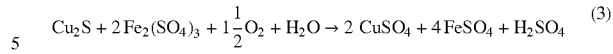

However, there is the problem that the rate of leaching of primary copper ores is not greatly improved over the conventional processes by using bacteria. Also, there is the problem that the optimum leaching conditions are different depending on the ores, shape of ores, storing condition of ores, properties of a mother rock, natural environment and the like. Besides the above conditions, essential factors relating to the process for leaching from copper ores include the number of bacteria, leaching temperature, leaching pH, amount of leaching solution, and amount of oxygen supplied.

SUMMARY OF THE INVENTION

This invention provides solutions to the problems described above. An object thereof is to provide improvements in the rate of leaching of copper in the bacteria leaching process with copper sulfide, as employed at present. Also, the present invention provides a process that promotes the overall velocity and rate of leaching.

The present inventors have studied the use of ores containing chalcocite to achieve the above object and, have developed the following processes of the present invention:

The invention is directed to a process for leaching copper by a bacteria leaching process using ores containing copper sulfide, wherein copper is leached with an acid leaching solution having a redox potential of from 550 to 750 mV, based on a silver/silver chloride electrode as a standard.

The invention is directed to a process for leaching copper, wherein the concentration of iron in the acid leaching solution is 5 g/IL or more, and the ratio of trivalent iron ions to bivalent iron ions (referred to as "$Fe^{3+}/Fe^{2+}$ ratio," hereinafter) is 50 or more. The invention is directed to a process for leaching copper, wherein iron is added to the acid leaching solution.

The invention is directed to a process for leaching copper, wherein a barren solution produced by recovering copper from the leached pregnant solution is repeatedly used as the acid leaching solution, and iron powder or a solution containing iron ions or iron powder is added to the acid leaching solution.

The invention is directed to a process for leaching copper, wherein the acid leaching solution contains one or both of an iron oxidizing bacteria and a sulfur oxidizing bacteria at a concentration of $10^6$ microbes/mL.

The invention is directed to a process for leaching copper, wherein the acid leaching solution utilizes one or both of an iron oxidizing bacteria and a sulfur oxidizing bacteria and wherein the bacteria are contained in ores.

The object of the present invention is to provide a process that enables the leaching time period to be shortened by positively controlling the bacteria concentration and the redox potential that is determined by the iron ions utilized for copper leaching.

Illustrating the actions of the processes having the above figures, the iron oxidizing bacteria oxidize $Fe^{2+}$ to $Fe^{3+}$, whereas the sulfur oxidizing bacteria oxidize S and $H_2S$ and also oxidize $Fe^{2+}$ to $Fe^{3+}$ at the same time. Both bacteria acquire energy for maintaining life by these oxidation processes. Utilization of $Fe^{3+}$ in the acid leaching solution promotes the ionization of copper. Also, a high redox potential is required so that copper elutes into the solution. The redox potential is the driving force for the elution. The relation between the $Fe^{3+}/Fe^{2+}$ ratio and redox potential of the acid leaching solution is defined by the following formula (4):

$$E=0.77+0.0591 \log (aFe^{3+}/aFe^{2+}) \qquad (4)$$

wherein "E" represents a redox potential and "a" represents an ion concentration.

Besides the influences of other ions that are impurities, the redox potential is determined by the $Fe^{3+}/Fe^{2+}$ ratio and it is necessary to increase this ratio. The amount of $Fe^{3+}$ in the acid leaching solution is increased and a high $Fe^{3+}/Fe^{2+}$ ratio is maintained to promote the extraction of copper. Specifically, the oxidation by bacteria is promoted and oxidizing agents are added so that it is possible to keep a constant $Fe^{3+}/Fe^{2+}$ ratio by controlling the amount of $Fe^{3+}$ and the redox potential.

Sulfuric acid, nitric acid, hydrochloric acid are given as the acid leaching solution used in the present invention. Of these, leaching using sulfuric acid is preferable since sulfur is contained in copper sulfide. Iron oxidizing bacteria, sulfur oxidizing bacteria and the like are used. These bacteria are generally bacteria growing under circumstances such as in mine effluent. These bacteria are registered with ATCC (American Type Culture Collection). Bacteria in mine water can be cultured and used in the present invention. This ensures that the bacteria are effective for the specific types of ores utilized.

Bacteria oxidize $Fe^{2+}$ to $Fe^{3+}$ in the acid leaching solution produced by leaching copper to increase $Fe^{3+}$ and thereby keeping a constant redox potential and promote leaching of copper. $Fe^{3+}$ in the acid leaching solution oxidizes Cu to $Cu^{2+}$ that is permitted to elute into the acid leaching solution. At the same time, Cu acts as a reducing agent to reduce $Fe^{3+}$ to $Fe^{2+}$.

In addition, oxygen or air may be introduced into the acid leaching solution to activate the bacteria and to supply oxygen required for the leaching reaction. Other than air, streams of pure oxygen, ozone or the like may be introduced.

Further, an oxidizing agent may be used as required, such as nitrogen oxide, aqueous hydrogen peroxide, potassium permanganate, air, and ozone. It is desirable to select these oxidizing agents by considering the economics, and depending on the conditions.

BRIEF DESCRIPTION OF DRAWINGS

FIG. 5 is a graph showing variations of the concentration 5 of bacteria versus the leaching time period (days).

DETAILED DESCRIPTION OF THE PREFERRED EMBODIMENTS

Figure 1:
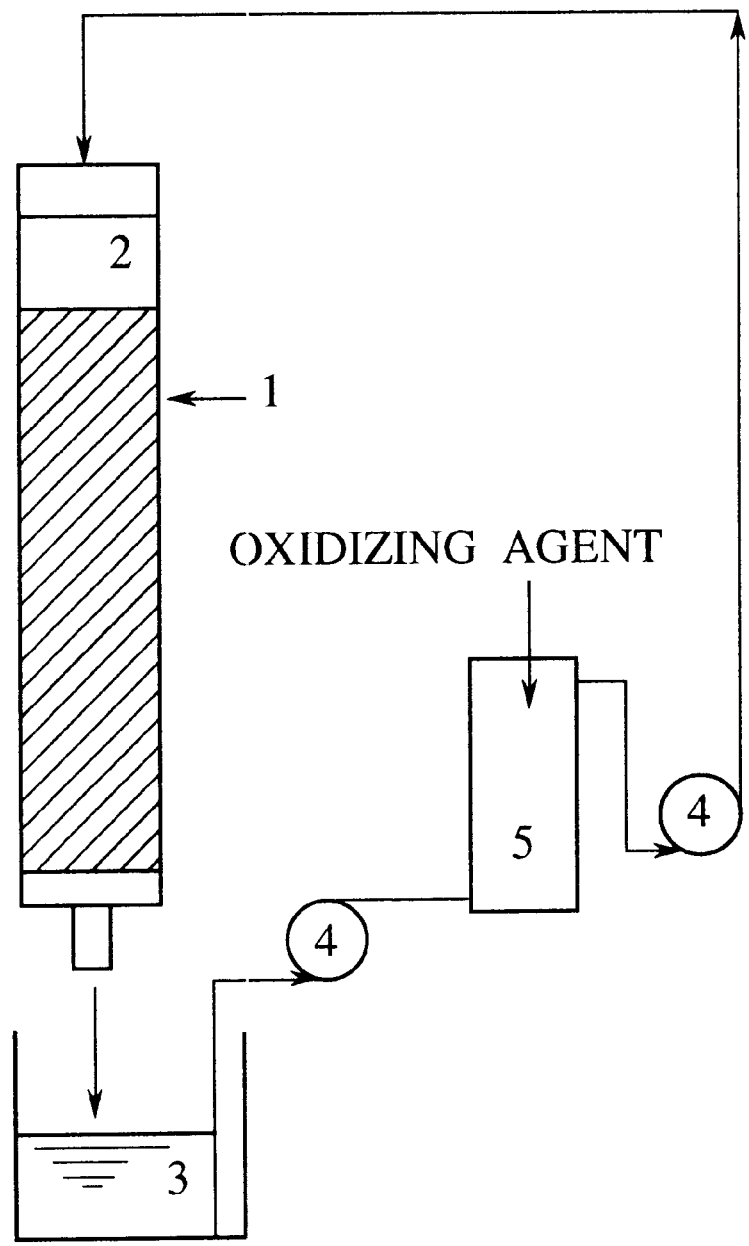
FIG. 1 is a typical view showing a process diagram according to the present invention.

The process for leaching copper in the present invention will now be explained in detail with reference to FIG. 1.

An acid leaching solution is applied to the top of a column apparatus (cylinder) 1 filled with copper sulfide 2. The acid leaching solution flows toward the lower portion of the column apparatus 1 while progressively leaching from the copper sulfide 2, and is received by a receiver 3. The acid leaching solution is partially recovered as a copper precipitate by the cementation method and is partially transferred to a potential adjusting vessel 5 by a fixed delivery pump 4. Here, the acid leaching solution is appropriately adjusted in the potential adjusting vessel 5, and is again disseminated into column apparatus 1 by the fixed delivery pump 4. The flow of the acid leaching solution is indicated by the arrow. Incidentally, when the grain size of the copper sulfide 2 is small, agglomeration of the copper sulfide 2 may be carried out in advance. By this treatment the acid leaching solution is prevented from clogging and short circuiting after the start of the leaching, and also the acid leaching solution can uniformly flow through copper sulfide 2 in the column apparatus 1.

The acid leaching solution is passed through the column apparatus 1 filled with the copper sulfide 2 by the fixed delivery pump 4 or the like, so that the flow rate per hour of the acid leaching solution is from 10 to 20 L per unit area of the cross section of the column apparatus 1. At this time, the acid leaching solution is uniformly disseminated on the cross section of the copper sulfide 2. The disseminated acid leaching solution flows through the copper sulfide 2 in the column apparatus 1 while leaching copper and is discharged from the bottom of the column apparatus 1. The discharged solution is received by the receiver 3. The redox potential of the acid leaching solution in the potential adjusting vessel 5 is measured. An oxidizing agent is added as required to adjust the redox potential of the leaching solution to maintain the potential of the acid leaching solution to 550 to 750 mV (AgCl). The acid leaching solution used for the leaching is an acid solution containing sulfuric acid. It is preferable that the concentration of sulfuric acid be about 10 g/L (pH 1–2), the concentration of iron be about 5–10 g/L, and the temperature be about 20–30° C. The column apparatus 1 may be provided with micropores at the periphery thereof to introduce air into the column apparatus 1 in which the copper leaching reaction is progressing.

A prescribed amount of acid leaching solution in the receiver 3 was sampled to measure the concentrations of sulfuric acid ($H_2SO_4$), iron ($Fe^{3+}$, $Fe^{2+}$), and copper ($Cu^{2+}$), and, at the same time, the redox potential and pH. Each measured data was analyzed. The redox potential of the acid leaching solution after analysis was adjusted by the addition of aqueous hydrogen peroxide (30% solution) into the potential adjusting vessel 5 to maintain prescribed properties of the leaching solution.

The bacteria used in the present invention were prepared by supplying mine water containing mainly iron oxidizing bacteria to a 9K culture medium and by culturing these bacteria. The resulting culture solution was concentrated with a centrifuge. The concentrated culture solution was mixed with ores containing the target metal and this mixture was added to a 9K culture medium excluding iron ions ($Fe^{2+}$), followed by incubation. The bacteria were grown up to the prescribed concentration while these were allowed to be familiar to the ores. The mine water is mine waste water containing at least iron (Fe), and preferably mine effluent after processing the target ores. In addition, a fixed amount of sample solution was taken, and the number of bacteria in the sample solution counted using a microscope. The total number of bacteria was converted to the concentration of bacteria.

EXAMPLES

The example of the present invention and comparative examples will be explained with reference to Table 1.

Example 1

A column apparatus 1 shown in FIG. 1 was filled with a copper sulfide 2 which assays 4.78% of copper in ores containing mainly chalcocite. Bacteria were added to a solution containing sulfuric acid at a concentration of 10 g/L and $Fe^{3+}$ at a concentration of 5 g/L so that the concentration of bacteria was $10^8$ cells/mL to prepare an acid leaching solution. The acid leaching solution was disseminated into the column apparatus 1 by a fixed delivery pump 4 at a rate of 10 L/hr per $m^2$ of the cross section of the column apparatus 1. The acid leaching solution disseminated into the column apparatus 1 was discharged from the bottom of the column apparatus 1 while leaching precious metals. A prescribed amount of the acid leaching solution withdrawn into a receiver 3 was sampled to measure the contents of sulfuric acid, iron, and copper. The redox potential and pH of the acid leaching solution were measured during the processing. The redox potential of the acid leaching solution was adjusted to 600 mV by the addition of an oxidizing agent. As the oxidizing agent, aqueous hydrogen peroxide (30% solution) was used.

Most iron in the acid leaching solution became $Fe^{3+}$ by controlling the redox potential by the addition of the oxidizing agent.

Comparative Example 1

The same procedures as in Example 1 were carried out according to the conventional process except that the concentration of sulfuric acid in the acid leaching solution was 5 g/L and the redox potential was unadjusted.

Comparative Example 2

The same procedures as in Example 1 were carried out except that no iron was added, and the redox potential was unadjusted.

Most iron in the acid leaching solution was $Fe^{2+}$, since the redox potential was unadjusted.

The rate of leaching of copper in Example 1 was higher than that in comparative Example 1 with a shorter leaching time period. It is also clear that the rate of leaching of copper was higher than in Comparative Example 2.

Figure 2:
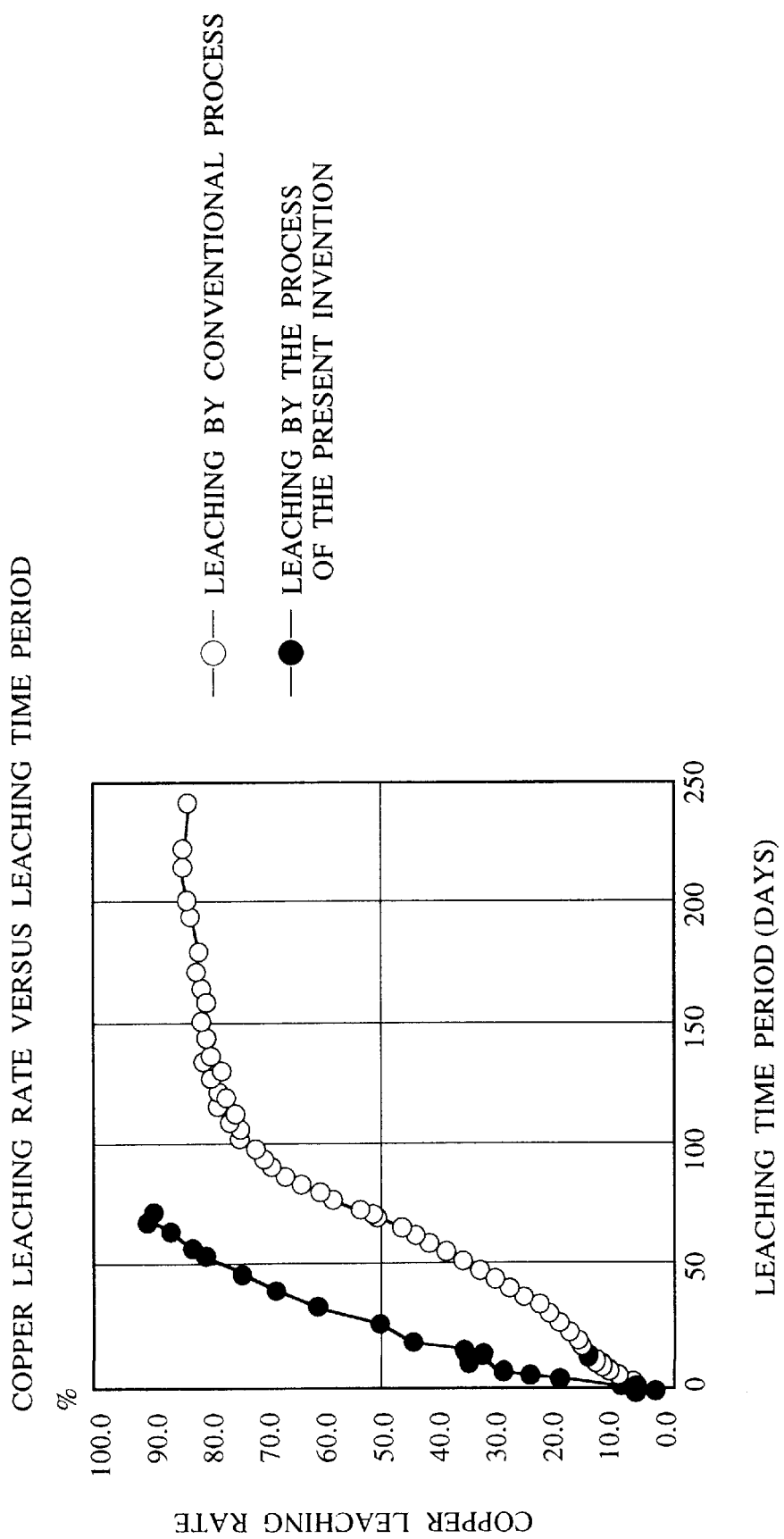
FIG. 2 is a graph showing the relation between the rate of leaching of copper and the leaching time period (days).

Various conditions versus leaching time period in Example 1 and Comparative Example 1 will be explained with reference to FIGS. 2 to 5. FIG. 2 shows the relation of the rate of leaching of copper versus the leaching time period.

In the conventional process, the rate of leaching of copper was 84.5% in 218 days from the start of the leaching process. However, in the process of the present invention, the rate of leaching of copper was from 88 to 91% in 68 days from the start of the leaching process. The leaching time period was shortened and the rate of leaching of copper was increased by the process of the present invention.

Figure 3:
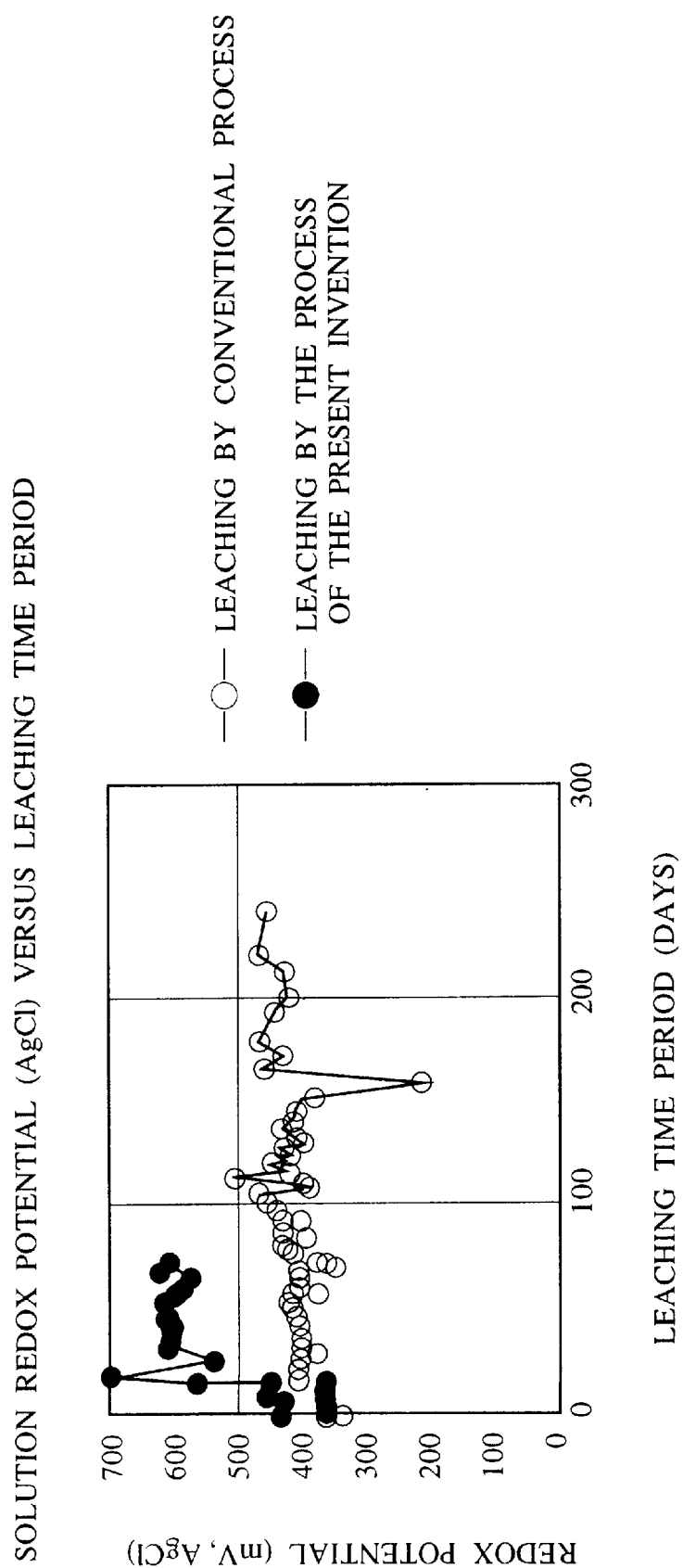
FIG. 3 is a graph showing variations of the redox potential (AgCl) versus the leaching time period (days).

Similarly, FIG. 3 shows the relation between the potential and the leaching time period, indicating variations of the potential of the leaching solution after leaching.

The acid leaching solution after leaching has a low potential at the beginning. This is because Fe2 is increased due to the leaching of copper. It is clear that copper is mainly leached due to a large difference between the designed primary redox potential and running redox potentials in a steady state. Therefore, it is confirmed that the leaching time period in the process of the present invention, in which the redox potential of the acid leaching solution is adjusted to and maintained at from 550 to 750 mV (AgCl), is shorter than that in an ordinary leaching process using iron oxidizing bacteria.

Figure 4:
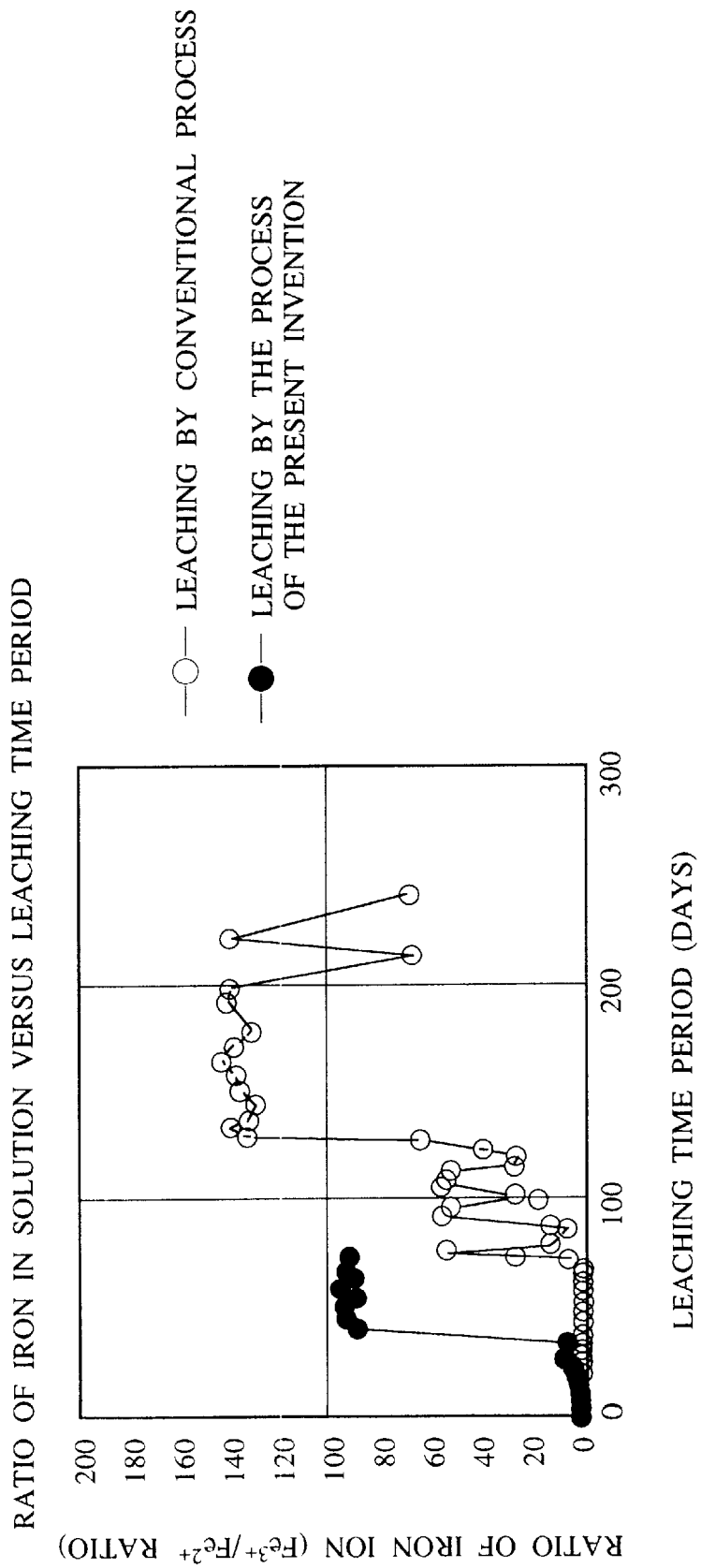
FIG. 4 is a graph showing variations of the ratio of iron ions ($Fe^{3+}/Fe^{2+}$ ratio) versus the leaching time period (days).

Also, as shown in FIG. 4, the $Fe^{3+}/Fe^{2+}$ ratio rises at an early stage in the leaching process of the present invention. This shows that unreacted $Fe^{3+}$ increases owing to iron oxidizing bacteria. Also, it is confirmed that if the $Fe^{3+}/Fe^{2+}$ ratio is 50 or more, the leaching of copper is maintained at a specific level, considering together the relation shown in FIG. 2.

Further, as shown in FIG. 5, it is clear from a comparison between the process of the present invention and the conventional process that the concentration of bacteria does not rapidly change after leaching. A specific concentration of bacteria is required from the primary stage. Specifically, $10^6$ microbes/mL may be maintained in the acid leaching solution.

TABLE 1

Leaching conditions and leaching results of Examples and Comparative Examples

|  | Example 1 | Comparative Example 1 | Comparative Example 2 |
|---|---|---|---|
| Leaching conditions |  |  |  |
| copper in ores(%) | 4.78 | 4.78 | 4.78 |
| redox potential(mV) | 600 | 400*) | 400*) |
| concentration of sulfuric acid(g/L) | 9.98 | 5.00 | 9.61 |
| concentration of iron(g/L) concentration of iron ion before leaching(g/L) | 5.20 | 5.00 | 0.30 |
| $Fe^{3+}$ | 5.00 | 0 | <0.01 |
| $Fe^{2+}$ | <0.01 | 5.00 | <0.01 |
| concentration of bacteria(microbes/mL) | 1.E + 08 | 1.E + 05 | 1.E + 08 |
| Leaching Results |  |  |  |
| Copper in ores(%) | 0.42 | 0.73 | 2.83 |
| leaching time period(day) | 68 | 213 | 88 |
| rate of leaching of copper(%) | 91.2 | 84.8 | 40.7 |

*)This value without controlling a redox potential.

It is apparent from a comparison between Example 1 and Comparative Examples 1 and 2 that the rate of leaching of copper increases, and the leaching time period decreases, in Example 1 according to the present invention.

As is clear from the above explanations, the process of the present invention has the advantages that the leaching time period is greatly reduced compared with conventional bacteria leaching processes, and that the rate of leaching of primary copper sulfide contained in ores can be increased. Specifically, the process of the present invention ensures reductions in construction costs for a leaching apparatus and in operation costs, and that the amount of the target ores to be treated can be increased.

What is claimed is:

1. A process for leaching copper from copper sulfide with a leaching solution comprising an acid, iron ions, and a bacteria acting as an oxidizing agent for ferrous ions, said process comprising the steps of:

combining the copper sulfide with the leaching solution; and controlling the ratio of trivalent iron ions to bivalent iron ions ($Fe^{3+}/Fe^{2+}$) in the leaching solution to 50 or more thereby keeping a redox potential of the acid leaching solution within the range of 550 mV to 750 mV based on a silver/silver chloride electrode as a standard, thereby leaching copper from the copper sulfide.

2. The process according to claim 1, wherein said leaching solution has an iron ion concentration of 5 g/L or more.

3. The process according to claim 1, wherein the step of controlling the ratio comprises the sub-steps of:
   collecting the leaching solution after finishing one cycle of leaching procedure;
   determining the redox potential of the collected leaching solution;
   adding an oxidizing agent to the leaching solution when the determined redox potential is below said range; and,
   reusing the leaching solution after the sub-step of adding an oxidizing agent for a next cycle of leaching procedure.

4. The process according to claim 1, wherein said leaching solution contains iron oxidizing bacteria and/or sulfur oxidizing bacteria in a concentration of $10^6$ microbes/mL.

5. The process according to claim 1, wherein said leaching solution utilizes iron oxidizing bacteria and/or sulfur oxidizing bacteria which are both contained in ores.

6. The process according to claim 1, wherein the step of controlling the ratio further comprises adding an oxidizing agent to said leaching solution.

7. The process according to claim 6, wherein the step of controlling the ratio further comprises adding an oxidizing agent to said leaching solution when the redox potential is below said range.

8. The process according to claims 3 or 6, wherein the oxidizing agent is selected from the group consisting of nitrogen oxide, aqueous hydrogen peroxide, potassium permanganate, air, and ozone.

9. The process according to claim 8, wherein the oxidizing agent is aqueous hydrogen peroxide.

10. The process according to claim 1, wherein the acid comprises sulfuric acid.

* * * * *